United States Patent
Bai et al.

(10) Patent No.: US 12,484,783 B2
(45) Date of Patent: Dec. 2, 2025

(54) DIFFUSION MAGNETIC RESONANCE METHOD FOR MEASURING CARDIAC-CYCLE-DEPENDENT GLYMPHATIC SYSTEM CIRCULATION

(71) Applicant: ZHEJIANG UNIVERSITY, Hangzhou (CN)

(72) Inventors: Ruiliang Bai, Hangzhou (CN); Fan Jiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/204,526

(22) Filed: May 10, 2025

(65) Prior Publication Data
US 2025/0344952 A1  Nov. 13, 2025

(30) Foreign Application Priority Data
May 11, 2024  (CN) .......................... 202410583336.9

(51) Int. Cl.
| | |
|---|---|
| A61B 5/00 | (2006.01) |
| A61B 5/024 | (2006.01) |
| A61B 5/055 | (2006.01) |
| G01R 33/48 | (2006.01) |
| G01R 33/50 | (2006.01) |
| G01R 33/563 | (2006.01) |

(52) U.S. Cl.
CPC ........ *A61B 5/0042* (2013.01); *A61B 5/02427* (2013.01); *A61B 5/055* (2013.01); *G01R 33/4806* (2013.01); *G01R 33/50* (2013.01); *G01R 33/56341* (2013.01)

(58) Field of Classification Search
CPC ................................................... A61B 5/0042
See application file for complete search history.

(56) References Cited

PUBLICATIONS

Wen, Assessing pulsatile waveforms of paravascular cerebrospinal fluid dynamics using dynamic diffusion-weighted imaging (dDWI). Neuroimaging 2022, Oct. 16, 260. (Year: 2022).*

\* cited by examiner

*Primary Examiner* — Joseph M Santos Rodriguez
(74) *Attorney, Agent, or Firm* — Jiwen Chen; Joywin IP Law PLLC

(57) ABSTRACT

The present invention discloses a diffusion magnetic resonance (MR) method for measuring arterial pulsation dependence of perivascular cerebrospinal fluid flow in glymphatic system: DTI acquisition: Brain MRI images were acquired using dynamic diffusion tensor imaging (DTI); Cardiac signal synchronization: Simultaneously collect heart rate fluctuation time-series signals; Peak coordinate determination: Identify the peak timing of cardiac pulsation signals from the time-series data; Image realignment: Reorganize brain MR images according to their temporal positions within the cardiac cycle; Temporal interpolation: Perform uniform time-sampling reconstruction to generate equidistant diffusion MRI datasets across the cardiac cycle; Parameter calculation: Compute axial diffusivity (AD), radial diffusivity (RD), and mean diffusivity (MD) at each voxel level; Mask-based analysis: Generate characteristic curves of AD/RD/MD and spin density(S) dynamics using region-specific masks in individual space. This method enables non-invasive measurement of: (1) Cerebrospinal fluid (CSF) flow velocity/direction in large perivascular spaces during heartbeats; (2) Microvascular perivascular CSF dynamics through diffusion parameter analysis.

10 Claims, 4 Drawing Sheets

DIFFUSION MAGNETIC RESONANCE METHOD FOR MEASURING CARDIAC-CYCLE-DEPENDENT GLYMPHATIC SYSTEM CIRCULATION

This application claims priority of Chinese Application No. 2024105833369, filed May 11, 2024, which is hereby incorporated by reference.

TECHNICAL FIELD

The present invention relates to the technical field of magnetic resonance imaging, and in particular to a diffusion magnetic resonance method for measuring cardiac-cycle-dependent glymphatic system circulation.

BACKGROUND TECHNOLOGY

The glymphatic system is a novel waste clearance mechanism in the brain that has only been proposed in recent years [Iliff, Jeffrey J et al. "A paravascular pathway facilitates CSF flow through the brain parenchyma and the clearance of interstitial solutes, including amyloid B." Science translational medicine vol. 4,147 (2012): 147ra111.] [Iliff, J. J et al. Cerebral arterial pulsation drives paravascular CSF-Interstitial fluid exchange in the murine brain. Journal of Neuroscience, 33 (46), (2013) 18190-18199.], wherein cerebrospinal fluid (CSF) serves as a critical transport medium in this system, specifically through the following process: CSF enters the brain via the perivascular spaces around arterial trees. With the assistance of aquaporin-4 (AQP4) expressed in the end-feet of perivascular astrocytes, CSF further penetrates the interstitial compartment. Convection currents are formed within the interstitial fluid (thereby accelerating clearance of interstitial molecules), and finally exits through venous perivascular pathways. Current measurement methods for the brain glymphatic circulation system are primarily invasive and indirect, posing risks of inaccurate measurements and interference with the brain glymphatic circulation system's physiological state, while also failing to be applicable to healthy populations. Existing techniques include: (1) Tracer-based optical imaging requires cranial window surgery on animals, which method. In addition, due to the limited depth of traditional light, the imaging range is limited to the surface of the cortex; (2) Dynamic contrast-enhanced magnetic resonance imaging (MRI) relies on cisterna *magna* injection of contrast agents into the cerebellomedullary cistern and can only observe the. macroscopic inflow and outflow velocity measurements of the brain's glymphatic circulation system, but cannot reflect microscopic information such as the volume of the intercellular matrix and the flow rate of the intercellular matrix fluid; (3) Parenchymal tracer injection (e.g., TMA) uses microelectrodes and other means for real-time concentration monitoring at a single point and in real time to calculate the size of the intercellular matrix and the flow rate of the tracer. However, this method is invasive, and the tracer injection and electrode implantation may induce local inflammation and disrupt AQP4 polarity, interfering with the glymphatic system circulation.

However, tools for non-invasive measurement of the human brain glymphatic system remain limited, and there is an increasing demand for the application of non-invasive MRI to evaluate the brain's glymphatic system and explore its underlying mechanisms. Diffusion MRI, as a non-invasive means of measuring the diffusion of water molecules, has been increasingly used in the measurement of the glymphatic system in recent years. In recent years, with the continuous deepening of research on glymphatic system research have driven significant progress in flow measurement techniques for arterial and venous perivascular spaces (PVS). Taoka et al. (2017) first proposed the ALPS index using DTI-based diffusion tensor analysis along perivascular spaces (Diffusion Tensor Image Analysis Along the Perivascular Space), providing a pioneering method to characterize venous PVS outflow via diffusion MRI in Alzheimer's disease patients [Taoka, T et al. Evaluation of glymphatic system activity with the diffusion MR technique: diffusion tensor image analysis along the perivascular space (DTI-ALPS) in Alzheimer's disease cases. (2017). 172-178. https://doi.org/10.1007/s11604-017-0617-z]. Subsequently, Harrison et al. (2018) introduced a long echo time (TE), low-b-value DTI approach to assess arterial PVS flow via apparent diffusion coefficient (D*) measurements [Harrison, I. F et al. Non-invasive imaging of CSF-mediated brain clearance pathways via assessment of perivascular fluid movement with diffusion tensor MRI. ELife, (2018). 7, e34028.]. Bito et al. (2021) later established the theoretical foundation for low-b-value DTI, demonstrating that D* directly correlates with fluid velocity [Bito Y et al. Low b-value diffusion tensor imaging for measuring pseudorandom flow of cerebrospinal fluid. Magn. Reson. Med., 2021, 86 (3): 1369-1382.]. Wen et al. (2022) extended this methodology using dynamic diffusion-weighted imaging (dDWI) to characterize pulsatile CSF dynamics in global perivascular spaces (PVS) and extract cardiac-dependent features [Wen Q et al. Assessing pulsatile waveforms of paravascular cerebrospinal fluid dynamics using dynamic diffusion-weighted imaging (dDWI). Neuroimage, Elsevier Inc., 2022, 260 (July): 119464.]. However, Wen's approach averaged diffusion-weighted signals across three orthogonal axes, failing to resolve directional flow dependencies. Notably, Wen's study only captured CSF flow around large arteries and superficial arteries, and failed to observe the cerebrospinal fluid flow characteristics around perforating arteries.

SUMMARY OF THE INVENTION

The object of the present invention is to provide a diffusion magnetic resonance method for measuring cardiac-cycle-dependent glymphatic system circulation. Through present invention, the flow rate and directional characteristic changes of cerebrospinal fluid (CSF) in the large-vessel perivascular spaces (PVS) blood vessels in the brain during the cardiac cycle can be achieved. It can also be used to measure the flow characteristics of cerebrospinal fluid in the spaces around small blood vessels during the cardiac cycle.

The present invention provides the following technical solutions:

A diffusion magnetic resonance method for measuring cardiac-cycle-dependent glymphatic system circulation, comprising:
(1) acquiring brain MRI images by using dynamic diffusion tensor imaging (DTI); simultaneously obtaining heart rate fluctuation signals time series via a finger pulse oximetry;
(2) determining the peak timing of cardiac pulsation signals from the heart rate fluctuation signals time-series; rearrange the time coordinates of the brain magnetic resonance image acquired in step (1) according to the specific position within the heart rate signal cycle or the cardiac-cycle;

(3) uniformly resampling the brain MR images from step (2) in the time dimension to generate equidistant diffusion MRI datasets across the cardiac-cycle;

(4) based on the equidistant diffusion MRI datasets in step (3), calculating axial diffusivity coefficient (AD), radial diffusivity coefficient (RD), and mean diffusivity coefficient (MD) at each voxel level representing the diffusion characteristics in the diffusion magnetic resonance image;

(5) based on the mask image of a specific area in the individual space, generating the axial diffusion coefficient AD, the radial diffusion coefficient RD, the mean diffusion coefficient MD and the characteristic curve of the diffusion magnetic resonance signal during the heart rate cycle.

For the purposes of the present invention, the signal time series of heart rate fluctuation is also called finger pulse blood oxygen signal; the peak coordinates of the heart fluctuation signal are also called pulse oxygen signal peak time coordinates; the heart rate cycle is also called cardiac cycle In step (1), the acquisition of the MRI dynamic diffusion tensor MRI technique sequence comprises two phases: first, the acquisition of magnetic resonance images without applying gradients is completed, and the acquisition is repeated multiple times; secondly, second, the image acquisition will be performed in different diffusion weighted directions, wherein multiple images are acquired in each diffusion weighted direction.

Preferably, in step (1), the dynamic diffusion tensor imaging (DTI) sequence parameters are optimized (including echo time [TE], diffusion gradient directions/intensities, and acquisition repetitions) to acquire brain MRI images. Specifically:

In step (1), the brain magnetic resonance image comprises: acquisition of a multi-diffusion weighted brain magnetic resonance image using a long echo time low diffusion weighted magnetic resonance sequence technology, wherein the long echo time TE is 100 ms-200 ms, and the diffusion weighted b value is 50 s/mm$^2$-300 s/mm$^2$;" On the basis of dynamic diffusion tensor magnetic resonance technology sequence, the brain magnetic resonance image without diffusion weight is scanned.

The echo time in dynamic DTI sequences should be long enough to produce transverse relaxation contrast between different tissue components, further highlighting the proportion of signal in the perivascular space of fluid, and therefore should be designed in the range (100-200 ms). Diffusion weighted b values should be designed in the range of (50-300 s/mm$^2$) because the intensity of diffusion gradient should not be too large.

The present invention provides contrast imaging in the transverse relaxation (T2) mode by using long echo time (TE), making the magnetic resonance image more sensitive to the components of the cerebrospinal fluid. Under the long echo time, the magnetic resonance image can be sensitive enough to the volume change of perivascular space. Using low diffusion weighted value b can make the axial diffusion coefficient of diffusion MRI and radial diffusion coefficient for the slow flow parameters, such as the pseudo diffusion effect caused by the more sensitive. Moreover, the diffusion coefficient involved will increase with the increase of the liquid flow rate.

In step (1), the diffusion-weighted MRI sequence technique has multiple diffusion-weighted gradient directions greater than or equal to 6. Acquisition with at least of 6 diffusion gradient directions enables tensor matrix reconstruction and calculation of axial diffusion coefficient and the radial diffusion coefficient.

In step (1), the acquisition of brain MRI data was repeated for the same number of times in each direction of the multi-diffusion weighted gradient; The number of repeat scans of non-diffusion-weighted brain MRI datasets was not less than the number of repeat scans of single gradient direction.

Through multiple acquisition of MRI, the acquisition time of MRI randomly falls within different phases of continuously recorded heart rate signals. That is, signal sampling with high temporal resolution can be achieved by repeated sampling. The principle of repeated sampling includes repeating the same number of times in each gradient direction in which the low diffusion-weighted b value is scanned repeatedly. In addition, it is necessary to repeatedly scan the magnetic resonance images without diffusion weighting, and the number of repetitions is not less than the number of repetitions in a single direction.

Preferably, in step (2), the high frequency noise signal in the time series of the heart rate fluctuation signal (one-dimensional time signal) is removed by filtering, and then the peak coordinates of the heart rate fluctuation signal are determined. By applying Fourier transform to the one-dimensional time signal, the high-frequency signal which is significantly larger than the heart pulse frequency is removed, which ensures that there is no noise interference in the subsequent automatic peak finding process.

Preferably, in step (3), the frequency of filter can be selected as a threshold value which is higher than the upper limit of the frequency of the human cardiac-cycle to filter out high frequency noise signals.

In step (2), the actual scanning time of brain magnetic resonance images is extracted layer by layer (such as using MATLAB to obtain the middle layer scanning time information in the image header file), and according to the actual scanning time, each layer of brain magnetic resonance images is rearranged so that they correspond to the signal time series of heart rate fluctuations (corresponding to the one-dimensional time series that determines the peak value of the heart rate signal), so that each layer of each frame of the brain magnetic resonance image has a cardiac-cycle, and the cardiac-cycle includes two adjacent peaks.

In step (2), rearrangement refers to regressing the magnetic resonance signal back to the cardiac-cycle, making it clear that MRI data of each frame each pixel in each layer corresponds to a specific coordinate within a specific pulse cycle.

Determining the specific position of each layer of magnetic resonance image acquisition time in the heart rate fluctuations in peak coordinate location, can be understood as follows: The coordinates close to the previous peak are −50%, the coordinates close to the next peak are 50%, and the coordinate interval of −50%-0% can be equivalent to the cardiac-cycle of 50%-100%, so that each layer of each frame of the magnetic resonance image has a specific cardiac-cycle coordinate of 0-100%.

Taking six gradient directions as an example for steps (2)-(3):

The magnetic resonance images of all the scans with different parameters were grouped into a group without gradient application and a group with gradient application. The signals of the applied gradient group are further divided into six groups according to six directions; there are seven groups in total. All magnetic resonance sequences in each group are rearranged, and the magnetic resonance signals of each layer are rearranged according to the specific heart rate cycle coordinates. Then, the built-in interpolation function of the MATLAB program is used to complete 100 differences of 0-100% within the heart rate cycle. After completing this step, 7 groups of magnetic resonance data are obtained, each group contains 100 frames of magnetic resonance data, and these 100 frames of magnetic resonance data are evenly distributed in one cardiac cycle.

Preferably, in step (4), the diffusion tensor model is fitted using a nonlinear least squares method to obtain the axial diffusion coefficient AD, radial diffusion coefficient RD and average diffusion coefficient MD of each pixel point in the diffusion magnetic resonance image.

In step (4), based on the uniformly interpolated magnetic resonance image within the cardiac cycle obtained in step (6), TORTOISE software can be used to extract relevant parameters such as diffusion characteristics and other related parameters of diffusion magnetic resonance images.

Preferably, in step (4), magnetic resonance image can be preprocessed (eddy current artifact correction, image acquisition distortion correction, etc.).

In step (5), the mask image based on a specific region in the individual space includes an artery mask image and a white matter mask image.

In step (5), the mask image can have physiological meaning: first, the arterial vascular probability map is registered from the standard space to the individual space, and the mask image represents the locations of the large arteries and the cerebrospinal fluid in the perivascular space around the superficial arteries visible by MRI; the second meaning is that the registration from standard space to specific white matter regions in individual space, such as corona *radiata*. The mask image represents the signal of cerebrospinal fluid (CSF) in the perivascular space of arterioles/veins, which is not visible on MRI.

The step (5) specifically includes:
(5-1) based on a T1 magnetic resonance image, a standard brain atlas is registered to the T1 structural image, and its affine transformation matrix is retained;
(5-2) based on the affine transformation matrix from a standard space to a individual space obtained in step (5-1), a white matter atlas in the standard space is registered to the individual space, and the white matter mask images are obtained by setting a threshold; a arterial map in the standard space is registered to the individual space, and a threshold is set to obtain the arterial mask images;
(5-3) the variation characteristic curves of axial diffusivity (AD), radial diffusivity (RD) and diffusion magnetic resonance signal S during the cardiac cycle of the arterial mask images, and the variation characteristic curves of mean diffusivity (MD) and diffusion magnetic resonance signal in white matter mask images during cardiac cycle are calculated.

Specifically, as in step (5-1), the standard brain atlas (MNI152) is registered to the T1 structural image based on the T1 magnetic resonance image using ANTS software.

Preferably, in step (5-3), the diffusion magnetic resonance signal of the arterial mask image is the diffusion magnetic resonance signal s under b=150 s/mm² (S(b=150 s/mm²)), while a diffusion magnetic resonance signal S of the white matter mask images is the original diffusion magnetic resonance signal (S(b=0 s/mm²)).

Compared with the prior art, the technical effect of the present invention is that:

The method provided by the present invention can non-invasively measure the fluid flow in the glymphatic system circulation. The magnetic resonance sequence in the method provided by the present invention adopts diffusion magnetic resonance technology, through multiple diffusion weighted direction coding and synchronous heart rate signal acquisition, Implements the clearance space around the artery cerebrospinal fluid rate fluctuates according to the artery cycle and the specificity of the direction detection (such as AD can flow parallel to the blood vessels of PVS, RD can flow perpendicular to the blood vessels of PVS), and cerebrospinal fluid flow around the tiny blood vessels can be applied to measure the clearance (such as for smaller PVS space, The mean diffusivity (MD) was used to denote the diffusivity.

DETAILED DESCRIPTION OF THE EMBODIMENTS OF THE INVENTION

To elucidate the object, technical solutions, and advantages of the present invention, further detailed descriptions are provided hereinbelow with reference to the accompanying drawings and embodiments. It should be understood that the specific embodiments described are intended solely to illustrate the invention and shall not be construed to limit the scope of protection.

The technical principles of the present invention are based on: (1) Long echo time is used to increase the contrast of cerebrospinal fluid components in the signal, so that the cerebrospinal fluid signal with a small proportion in the perivascular space can be measured by magnetic resonance technology; (2) By using a lower diffusion intensity b value, the diffusion magnetic resonance technique is not only sensitive to the diffusion of water molecules, but also has a high sensitivity to the pseudo-diffusion effect caused by the slow flow of liquid; (3) When the flow rate of the liquid is at a low diffusion intensity b value, the apparent diffusion coefficient increases with the increase of the liquid flow rate, showing a monotonically increasing characteristic.

Figure 1:
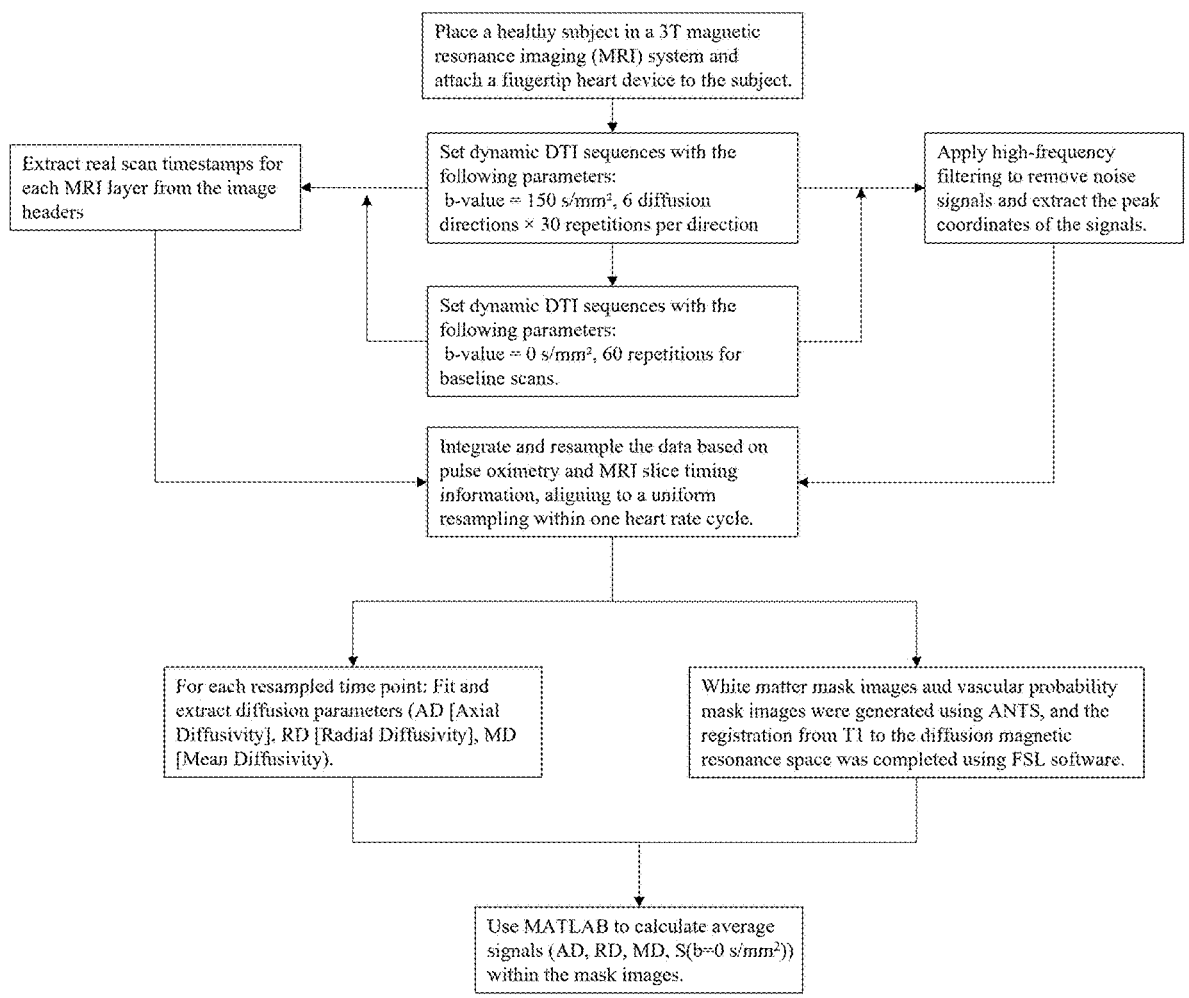
FIG. 1 is a general flow chart of a diffusion magnetic resonance method for measuring cardiac-cycle-dependent glymphatic circulation provided by an embodiment.

As a specific implementation example, the cardiac-cycle-dependent glymphatic circulation diffusion MRI method of the present invention was applied to the brains of adult healthy subjects, with the operational flowchart illustrated in FIG. 1. The procedure includes the following steps:

Step 1: An adult healthy subject was positioned in a 3T magnetic resonance imaging (MRI) system with the head centered as the scanning origin. Brain MRI data from 8 adult healthy subjects were acquired. All subjects were monitored with a finger pulse oximetry device attached to the thumb to record heart rate pulsation signals (i.e., time-series heart rate fluctuation data or one-dimensional finger pulse oximetry waveform).

Figure 2:
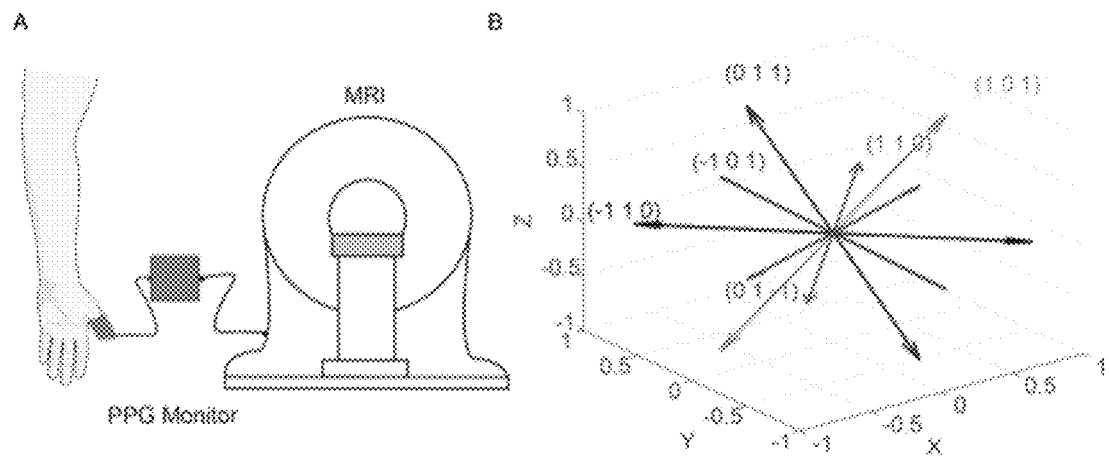
FIG. 2 is a diagram showing a method paradigm and demonstration diagram of the designed six directional gradient spatial encoding designs provided by an embodiment.

Step 2: Brain MRI data were acquired under multiple diffusion-weighted directions, with repeated acquisitions in each diffusion weighted direction; more specifically:

The dynamic diffusion tensor magnetic resonance technology sequence was set to 1.5×1.5 mm² resolution and 1.5 mm slice thickness. The middle position of the corpus callosum in the head to foot direction was set as the middle position of the scanning FOV (Field of View), and a total of 49 layers were collected. The b-value of diffusion weighted imaging should be set to 150 s/mm². Diffusion weighted direction is set to 6 gradient direction, respectively is: [1, 0, 1], [−1, 0, 1], [0, 1, 1], [0, 1, 1], [1, 1, 0], [1, 1, 0]. The diffusion-weighted direction was set to 1 of the 6 directions in FIG. 2, and was repeated 30 times in each direction. The echo time TE of the sequence was set to 130 ms.

Step 3: The brain magnetic resonance image was acquired without applying gradient, and the acquisition was repeated for many times. Specifically as follows:

On the basis of the dynamic diffusion tensor magnetic resonance technique sequence, the diffusion weighted image should be scanned without diffusion weight, and the diffusion weight value should be set to 0 s/mm² (without gradient application), and repeated for 60 times. Keep the other parameter values of the sequence unchanged.

Step 4: High-frequency filtering for noise removal and peak coordinate extraction.

MATLAB software was employed to extract the temporal peak coordinates (cardiac cycle landmarks) from the finger pulse oximetry signals acquired in Step 1. A high-pass filter was applied to eliminate high-frequency artifacts, subsequently identifying the peak timing within each cardiac cycle (defined as the time point of maximum blood pressure amplitude).

Step 5: Analyzing the actual acquisition time of each layer in the header file of the magnetic resonance data (brain magnetic resonance image data), specifically:

Using MATLAB software, the metadata headers of brain MRI images obtained in Step 2 and Step 3 were parsed to retrieve the precise actual acquisition timestamps for each scan layer.

Figure 3:
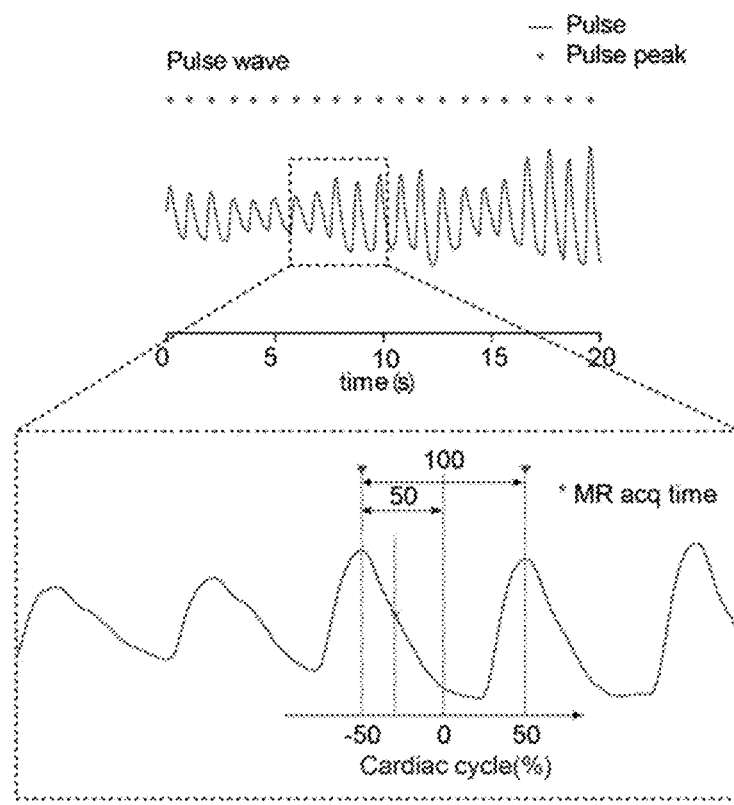
FIG. 3 is a diagram showing a method of corresponding magnetic resonance time to a pulse cycle.

Step 6: Integrating the peak time information of the finger pulse blood oxygen and the time information of each layer of the magnetic resonance and correspond to a heart rate cycle, specifically:

The per-layer MRI acquisition times from Step 5 were mapped to the finger pulse oximetry time series in Step 4 via MATLAB software. As illustrated in FIG. 3, the temporal alignment follows: The sampling time of layer by layer of brain MRI data obtained in step 5 was corresponding to the one-dimensional finger pulse heart rate and blood oxygen data in step 4 by using MATLAB software. The method shown in FIG. 3 was used to determine the specific position of the acquisition time of each layer of magnetic resonance image in the coordinates of the heart rate fluctuation peaks: the coordinate close to the previous peak was 50%, and the center coordinate of each peak-to-peak coordinate was 100% (also 0%). In this way, each layer of each frame of the magnetic resonance image has a specific cardiac-cycle coordinate of 0%-100%; After reordering, the ordered data of the magnetic resonance image in the peak-to-peak interval of the blood oxygen signal can be obtained, so that the valley-peak-valley timing signal can be easily displayed.

Step 7: Performing uniform resampling within the cardiac cycle, as follows: MATLAB software was used to resample the brain magnetic resonance image data after reordering in step 6 in a cardiac cycle. After the interpolation function built in the MATLAB program, the 100 times difference between 0-100% in the cardiac-cycle was completed. After completing this step, seven groups of brain magnetic resonance image data evenly distributed in the cardiac cycle will be obtained, each group contains 100 frames of magnetic resonance data, which are evenly distributed in a cardiac cycle.

Step 8: Fitting the diffusion magnetic resonance data and extracting the target parameters for the data at each resampling time point, specifically:

TORTOISE software was used to complete the extraction of diffusion-related parameters such as diffusion characteristics of diffusion magnetic resonance in step 7: The nonlinear least square method was used to fit the diffusion tensor model to obtain the Axial Diffusivity (AD), Radial Diffusivity (RD) and mean diffusivity (MD) of each pixel in the image.

Step 9: Generating white matter mask images and vascular probability mask images using ANTS software, and completing T1 to diffusion magnetic resonance space registration using FSL software.

(1) The ANTS software was used to complete T1 structural image registration from the standard space to the individual space, and the affine transformation matrix obtained during the registration process was saved.

(2) Using ANTS software, the white matter standard map in standard space was registered to the individual space, and the threshold was determined, which was saved as the mask image of the white matter region.

(3) Using ANTS software, the standard map of arterial blood vessels in standard space was registered to the individual space, and the threshold was determined, which was saved as the mask image of blood vessel region.

(4) The FSL: "epi_reg" command was used to complete the registration of T1 image to diffusion magnetic resonance image, and the affine transformation matrix was retained.

(5) The FSL: flirt command was used to combine the white matter mask image and the arterial mask image obtained by segmentation to register the T1 space into the diffusion magnetic resonance data space.

Step 10: MATLAB software was used to analyze the dynamic diffusion tensor magnetic resonance (DTI) parameters under different mask images during the cardiac cycle. The information of AD, RD, MD, S(b=0 s/mm²) and S(b=150 s/mm²) was extracted by using the principle of multiplying the target parameter matrix with the mask image.

Figure 4:
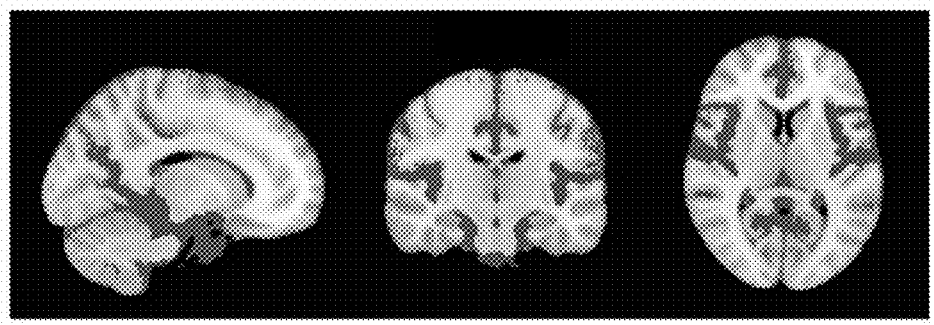
FIG. 4 shows the display of the mask image in the standard space.
Figure 4:
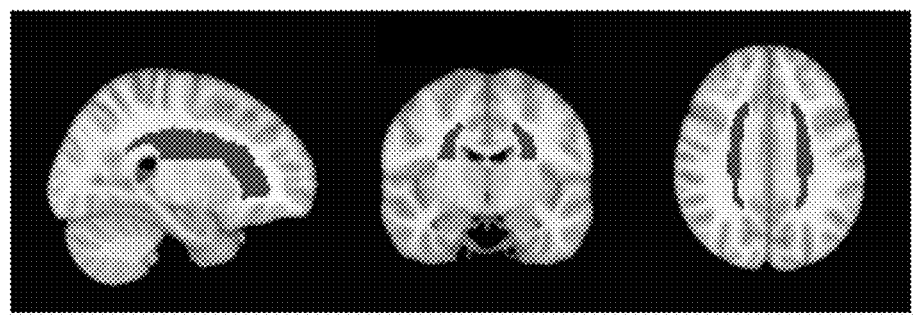
Figure 5:
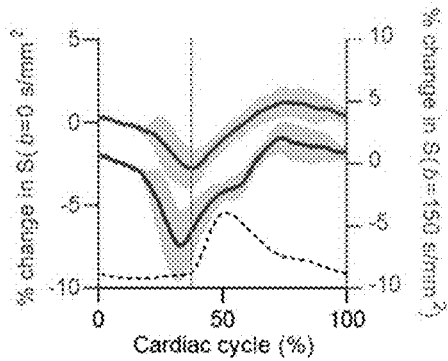
FIG. 5 is a graph showing the variation trend of the original diffusion magnetic resonance signal in the cardiac-cycle.
Figure 5:
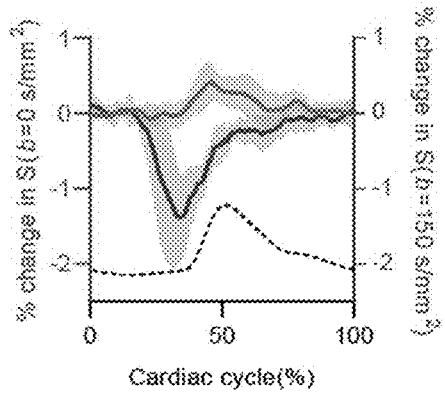
Figure 6:
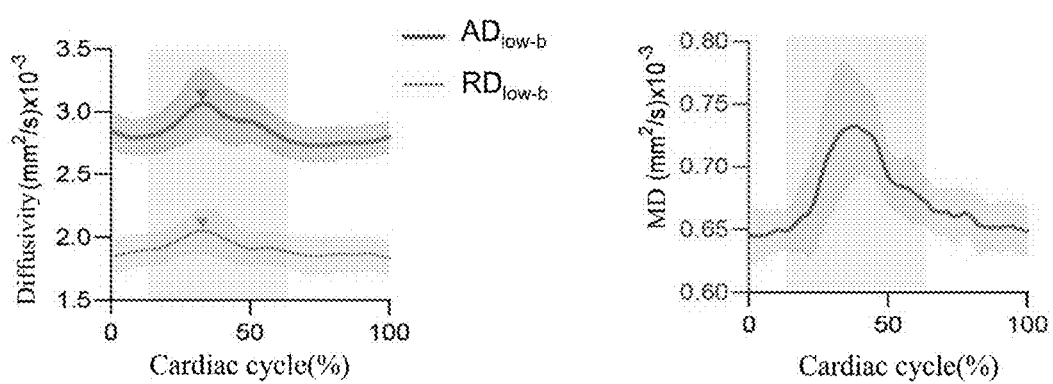
FIG. 6 is a graph showing the variation trend of diffusion magnetic resonance related parameters in cardiac cycles.

The diffusion magnetic resonance method for measuring the cardiac-cycle-dependent glymphatic circulation provided in this example can generate a magnetic resonance image of the heart pulse changes by simultaneously collecting the magnetic resonance image data and the pulse heart rate data. By evaluating the diffusion tensor magnetic resonance parameters and analyzing the masked area images of specific regions (FIG. 4, taking the corona *radiata* region of white matter as an example), the CSF flow in the perivascular space of arteries of different sizes and around the small arteries of white matter could be analyzed (FIG. 5 and FIG. 6). It can be seen from the results that the axial diffusivity (AD), radial diffusivity (RD) and mean diffusivity (MD) under different mask images all have a trend of changing with heart rate. At the same time, the signal S(b=0 s/mm²) without gradient also has a trend of changing with heart rate, which can be considered as the reduction of perivascular space caused by blood vessel expansion, which can reflect the process of blood vessel expansion. It can also be seen from the results in FIG. 5 and FIG. 6 that AD and RD reach the maximum in the process of blood vessel expansion. Based on this phenomenon, it can be shown that the axial radial flow rate of fluid in the perivascular space caused by blood vessel expansion increases. Through the diffusion magnetic resonance method proposed by the invention, direct data of fluid in the perivascular space driven by arterial fluctuations can be obtained.

The above specific embodiments are described in detail the technical scheme and beneficial effects of the present invention. It should be understood that the above embodiments are only the most preferred embodiments of the present invention and are not used to limit the present invention. Any modifications, additions and equivalent replacement made within the scope of principle of the present invention shall be included within the scope of protection of the present invention.

The invention claimed is:

1. A diffusion magnetic resonance method for measuring cardiac-cycle-dependent glymphatic system circulation, comprising:
    (1) acquiring brain magnetic resonance (MR) images by using dynamic diffusion tensor imaging (DTI); simultaneously obtaining heart rate fluctuation time-series signals via a finger pulse blood oxygen monitoring device;
    (2) determining a peak timing of cardiac pulsation signals from the heart rate fluctuation time-series signals; reorganizing the acquisition time coordinates of the brain MRI data in step (1) according to their temporal positions within the cardiac cycle;
    (3) uniformly resampling the brain MR images from step (2) in the time dimension to generate equidistant diffusion MRI datasets across the cardiac cycle;
    (4) calculating axial diffusivity (AD), radial diffusivity (RD), and mean diffusivity (MD) at each voxel level based on the equidistant diffusion MRI datasets in step (3);
    (5) generating variation characteristic curves of axial diffusivity AD, radial diffusivity RD, mean diffusivity MD, and diffusion MRI signal dynamics during the cardiac cycle using region-specific mask images in individual space;
    wherein, in step (5), the mask image based on a specific area in the individual space comprise arterial mask images and white matter mask images.

2. The diffusion magnetic resonance method for measuring cardiac-cycle-dependent glymphatic system circulation of claim 1, characterized in that in step (1), the brain MR images comprise: the brain MR images of multi-diffusion-weighted acquired by using a long echo time (TE) low diffusion-weighted dynamic diffusion tensor imaging (DTI) sequence, wherein: TE=100 milliseconds-200 milliseconds; diffusion-weighted b-value=50 s/mm$^2$-300 s/mm$^2$; non-diffusion-weighted baseline images are co-acquired based on the DTI.

3. The diffusion magnetic resonance method for measuring cardiac-cycle-dependent glymphatic system circulation of claim 2, characterized in that the diffusion-weighted DTI sequence employs gradient directions are greater than or equal to 6.

4. The diffusion magnetic resonance method for measuring cardiac-cycle-dependent glymphatic system circulation of claim 3, characterized in that: each gradient direction in step (3) is repeated the same number of times to acquire the brain MR data; non-diffusion-weighted images are scanned with a number of repetitions equal to or exceeding those used for single-gradient-direction repetitions.

5. The diffusion magnetic resonance method for measuring cardiac-cycle-dependent glymphatic system circulation of claim 1, characterized in that in step (2), high-pass filtering is applied to remove high-frequency noise from heart rate fluctuation time-series before determining the peak timing of cardiac pulsation signals.

6. The diffusion magnetic resonance method for measuring cardiac-cycle-dependent glymphatic system circulation of claim 1, characterized in that in step (2): actual scan timestamps of brain MR images are extracted; each MRI layer is realigned to the cardiac-cycle based on its true scan time, ensuring each frame-layer corresponds to, a full cardiac cycle comprises two adjacent peaks.

7. The diffusion magnetic resonance method for measuring cardiac-cycle-dependent glymphatic system circulation of claim 1, characterized in that in step (4), the diffusivity (AD), radial diffusivity (RD), and mean diffusivity (MD) of per-pixel axial are derived via a nonlinear least square regression of the diffusion tensor model.

8. The diffusion magnetic resonance method for measuring cardiac-cycle-dependent glymphatic system circulation of claim 1, characterized in that step (5) further comprises:
    (5-1) based on a T1 magnetic resonance image, registering a standard brain atlas to the T1 structural image, and retaining its affine transformation matrixed;
    (5-2) based on the affine transformation matrix from a standard space to an individual space obtained in step (5-1), registering a white matter atlas in the standard space to the individual space, and obtaining the white matter mask images by setting a threshold; registering an arterial map in the standard space to the individual space, and setting a threshold to obtain the arterial mask images;
    (5-3) calculating the variation characteristic curves of axial diffusion coefficient AD, radial diffusion coefficient RD and diffusion magnetic resonance signal S during the cardiac cycle of the arterial mask images, and the variation characteristic curves of average diffusion coefficient MD and diffusion magnetic resonance signal in white matter mask images during cardiac cycle.

9. The diffusion magnetic resonance method for measuring cardiac-cycle-dependent glymphatic system circulation of claim 1, characterized in that a diffusion magnetic resonance signal S of the arterial mask images is the diffusion magnetic resonance signal under b=150 s/mm$^2$, and a diffusion magnetic resonance signal of the white matter mask images is the original diffusion magnetic resonance signal.

10. The diffusion magnetic resonance method for measuring cardiac-cycle-dependent glymphatic system circulation of claim 8, characterized in that a diffusion magnetic resonance signal S of the arterial mask images is the diffusion magnetic resonance signal under b=150 s/mm$^2$, and a diffusion magnetic resonance signal of the white matter mask images is the original diffusion magnetic resonance signal.

* * * * *